Feb. 28, 1956
C. BEALS
2,736,423
CHAIN CONVEYOR LIFT
Filed Nov. 21, 1952
2 Sheets-Sheet 1
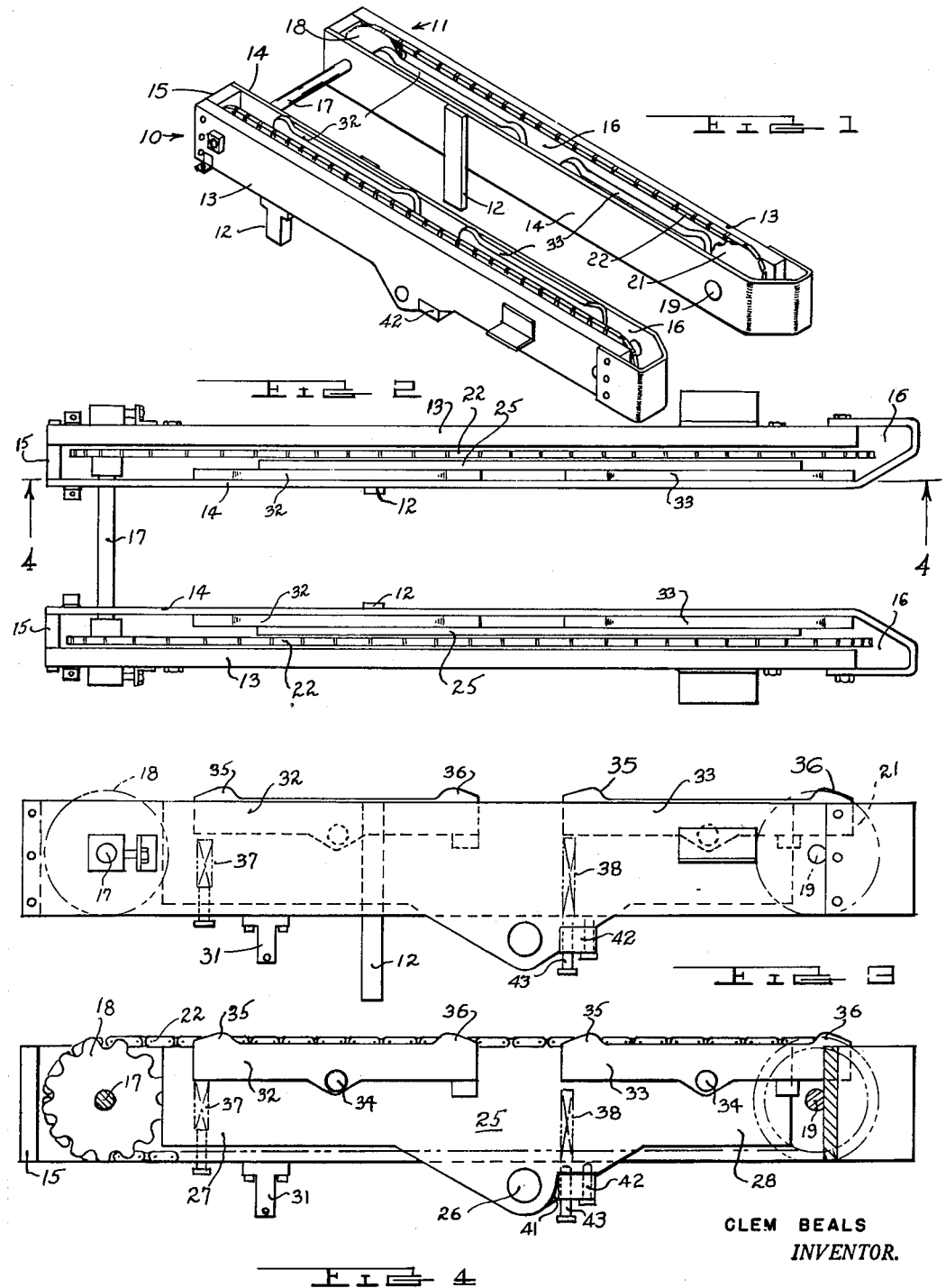
CLEM BEALS
INVENTOR.
BY Tom Walker
ATTORNEY Feb. 28, 1956 C. BEALS 2,736,423
CHAIN CONVEYOR LIFT
Filed Nov. 21, 1952 2 Sheets-Sheet 2
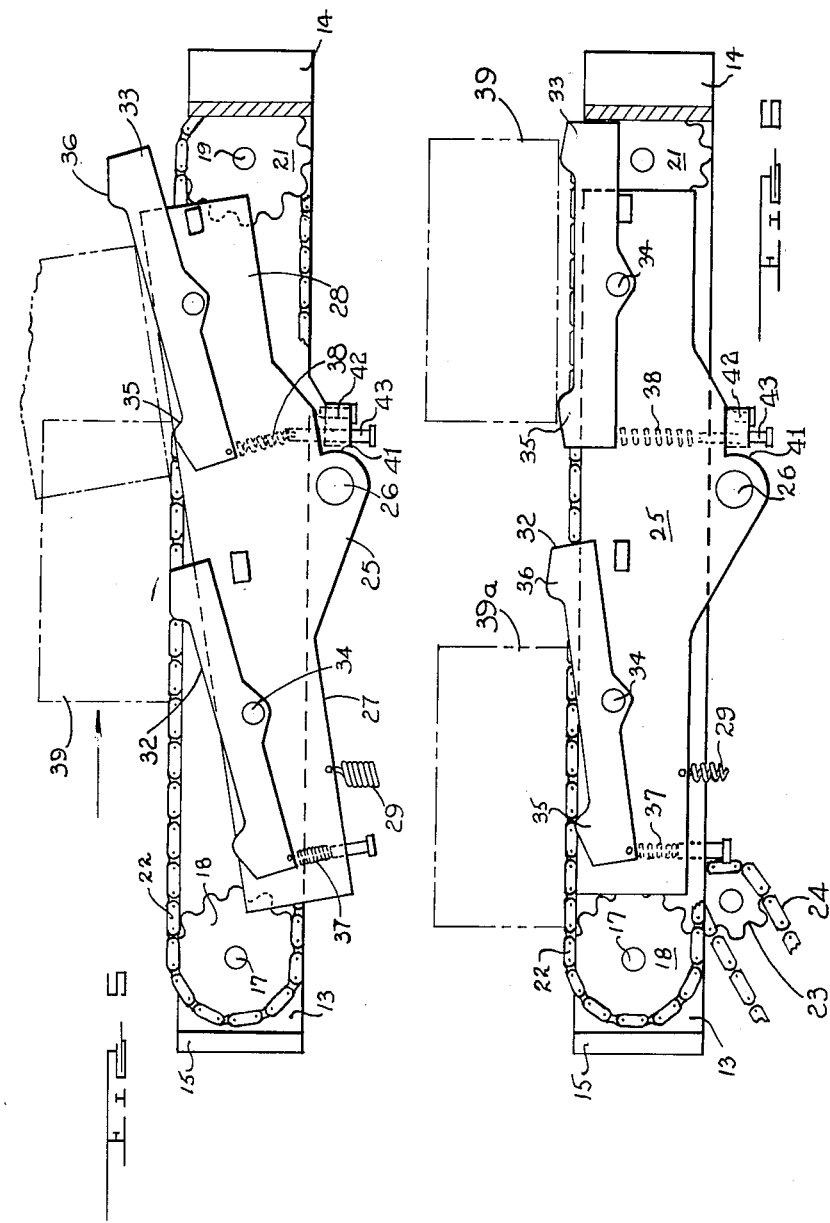
CLEM BEALS
*INVENTOR.*
BY *Tom Walker*
ATTORNEY

United States Patent Office 2,736,423
Patented Feb. 28, 1956

2,736,423

CHAIN CONVEYOR LIFT

Clem Beals, Springfield, Ohio

Application November 21, 1952, Serial No. 321,908

12 Claims. (Cl. 198—185)

This invention relates to conveyor unloading apparatus, and more particularly to a receiver device for removing successive articles from a conveyor system.

Although not so limited, the invention has particular application to concrete block molding machinery. In this art, block molds are placed on pallets, the concrete is poured and the pallets are vibrated to set the concrete. The pallets are progressively fed past concrete pouring and vibrating stations by conveyor means. The discharge and stop mechanism heretofore used conventionally has comprised inclined roller means, so arranged that pallets bearing the freshly molded blocks slide by gravity to a place where an operator can lift and place them for drying of the blocks. Each pallet must be lifted individually, and before the next following one is discharged, since if a first discharged pallet is not removed before the next following one is discharged there may be a colliding or bumping of the pallets which would deform the still soft blocks.

The object of the invention is to simplify the construction as well as the means and mode of operation of chain conveyor lifts whereby such equipment may not only be economically manufactured, but will be more efficient and practical in use, adaptable to a wide range of applications, having relatively few parts, and be unlikely to get out of repair.

An object of the instant invention is to obviate disadvantages of the prior art discharge mechanism, it being proposed to provide a receiver device which permits the unloading of two pallets or other articles at a time and which further avoids contact between such pallets.

Another object of the invention is to provide lift means in connection with a chain conveyor or the like, whereby successive articles on the conveyor may be raised and held out of contact with the conveyor, in position to be simultaneously engaged and removed by a lift truck or appropriate hoist mechanism.

A further object of the invention is to provide a generally new receiver device for use as the terminal end of a conveyor and operable to make individual interception of successive articles discharged upon the receiver.

A further object of the invention is to provide a chain conveyor lift possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Referring to the drawings, wherein is found the preferred but obviously not necessarily the only form of embodiment of the invention.

Fig. 1 is a view in perspective of a receiver or conveyor unloading device in accordance with the illustrative embodiment of the invention;

Fig. 2 is a top plan view of the receiver device;

Fig. 3 is a view of the receiver device in side elevation;

Fig. 4 is a view in longitudinal section taken substantially along the line 4—4 of Fig. 2, and showing the parts as they appear with two pallets or articles loaded or in lifted position;

Fig. 5 is a view similar to Fig. 4, showing the parts as they appear with the first of a pair of pallets about to be lifted from the conveyor; and Fig. 6 is a view similar to Fig. 5, showing the parts as they appear after the first pallet has been lifted and with the second of the pair of pallets about to be lifted from the conveyor.

Like parts are indicated by similar characters of reference throughout the several views.

Referring to the drawings, conveyor apparatus in accordance with the instant illustrative embodiment of the invention takes the form of a receiver adapted to serve as the terminal end of a conveyor system. Further, in accordance with the illustrative embodiment of the invention, such receiver is constructed and arranged for use in a conveyor system handling relatively wide objects such as pallets. It accordingly comprises a plurality of substantially identical units, in the present instance two, respectively engageable with the under side of the pallets adjacent to the ends thereof.

As shown in Fig. 1, these units, indicated at 10 and 11 respectively, are arranged in side by side opposing relation and are stationarily mounted on a standard 12 or the like. Each comprises spaced apart supporting plates 13 and 14. A spacer block 15 is interposed between the plates 13 and 14 at one end thereof. At the opposite end, the plate 14 is turned over to embrace the corresponding end of the plate 13, and is secured thereto. The arrangement is such as to provide a partly enclosed chamber 16 within which the conveyor chain and unloading devices are housed.

Near its one end the chamber 16 is intersected by a transverse shaft 17, which shaft is common to and interconnects the units 10 and 11. On the shaft 17 in each of the units 10 and 11 is a sprocket wheel 18. At the opposite end of the chamber 16 is a stub shaft 19 rotatably mounted between the plates 13 and 14. A sprocket wheel 21 is secured to the stub shaft 19. A continuous chain 22 is mounted on and runs over the sprocket wheels 18 and 21.

The sprocket chain in the unit 10 is suitably driven in the operation of the system, as for example through an underlying sprocket wheel 23 and chain 24 (Fig. 6). There is accordingly a continuous movement of the chain 22 longitudinally in the chamber 16 while the conveyor system is in operation. The chains 22 of the respective units 10 and 11 are driven in unison by reason of the unitary relationship established by the shaft 17.

In the installation of the receiving device, one end thereof is the receiving end and the other end is the discharge end. As here viewed, the left hand end of the device is the receiving end. In that end of the device appears the transverse shaft 17. The opposite end of the device is open and unobstructed.

Also contained within the chamber 16 is an unloading lever 25 mounted on a pivot pin 26 extending between the plates 13 and 14. The lever 25 is in parallel relation to the conveyor chain 22. The pivot pin 26 is located approximately in the middle of the lever. From such pivot point extend opposing arms 27 and 28 which may be called first and second arms as defined by the order in which objects moving on the conveyor chains 22 pass in adjacent relation thereto. As shown in Fig. 5, the lever 25 is biased in a counterclockwise direction by a tension spring 29 attached to the arm 27 and anchored to a fixed bracket 31. As further seen in Fig. 5, in such biased position of the lever 25 the arm 28 thereof is elevated relatively to the plane of the conveyor chain 22 while the arm 27 is depressed beneath the plane of the conveyor chain.

On each such arm 27 and 28 of the lever 25 is a respective auxiliary lever 32 and 33. These are identical in construction and mounting so that only one will be described in detail. Thus, the auxiliary lever is pivotally connected by a stud 34 to the lever 25. The pivot stud 34 occurs at the middle of the auxiliary lever which lies in parallel relation to the lever 25 and has projecting bosses 35 and 36 on its upper edge adjacent to the ends thereof. Tension springs 37 and 38 are attached to the left hand ends of the respective auxiliary levers 32 and 33 and urge such levers to the positions shown in Fig. 5 wherein the right hand ends of the levers are elevated relatively to the upper edge of lever 25 whereas the left hand ends of the levers 32 and 33 are depressed or flush with respect to the upper edge of the lever 25.

According to the construction and arrangement of parts, the conveyor chains 22 lie in a slightly higher plane than the upper edges of the plates 13 and 14. Thus objects received by the chains may be conveyed in overlying relation to the plates 13 and 14. Further, with the parts under the influence of the several springs 29, 37 and 38, the right hand end of the lever 25, or arm 28 thereof, projects above the plane of the chain 22, as does the embossed portion 36 of the lever 33 which further lies in a plane above the upper edge of lever 25.

In the operation of the receiving device, the parts normally are positioned as shown in Fig. 5. When an object, as the object 39 shown in Fig. 5, is received on the conveyor chain 22 it moves toward the discharge end of the device, passing over the depressed arm 27 of the lever 25 and the auxiliary lever 32 thereon. Further motion of the object 39, on the conveyor, brings the leading end thereof into contact with the upper edge of lever arm 28 and with the upper edge of auxiliary lever 33 mounted thereon. The lever 33 being tilted relatively to the arm 28, the object tends to ride upward on the lever 33 which, however, rocks under the weight of the object in a clockwise direction against the urging of spring 38. Such motion results in and is limited by engagement of the left hand boss 35 with the object adjacent to its trailing end. Continued motion of the object 39 causes it to engage and to ride up on the embossment 36 thereby effecting a further rocking movement of the lever 33 in a clockwise direction resulting in the application of a lifting motion to the object, raising it from the conveyor chain 22 to a position of rest upon the opposed bosses 35 and 36.

As a part of the operation described above, the weight of the object 39 is shifted from the conveyor chains 22 to the arms 28 of the levers 25. In response thereto, the levers 25 rock in a clockwise direction against the urging of springs 29 in a manner to bring the levers to a substantially horizontal position. In such position, the auxiliary levers 33 continue to hold the object 39 elevated with respect to the chains 22 by reason of the projecting bosses 35 and 36. In the case of auxiliary lever 32, however, this lever continues to occupy the position relative to lever 25 which is illustrated in Fig. 5, although the right hand end thereof is interposed in the path of travel of the next succeeding object, indicated as 39a, achieves cooperative relation with lever 32 and is elevated by such lever in the same manner described in connection with object 39 and auxiliary lever 33. When both objects have been so lifted from the conveyor, a lift truck or hoist device may be directed into the open discharge end of the receiver device and pick the objects 39 and 39a therefrom singly or both in one operation. When the objects are so removed from the receiver device the levers 25, and the auxiliary levers 32 and 33, automatically will resume their normal position under the urging of springs 29, 37 and 38 so that the device is conditioned to receive the next following pair of objects.

In the region of the pivot pin 26, the lever 25 and the side plates 13 and 14 have dependent ear portions which are aligned with one another. This portion of the lever 25 is cut away along one edge thereof to form an angular recess 41 accommodating a bar 42 secured to one or both of the side plates 13 and 14 in transverse underlying relation to the lever 25. The bar 42 provides a mounting for a stud 43 to which the tensile spring 38 is anchored. Also, it serves as a stop, engageable by the upper horizontal edge of the recess 41 to limit motion of the lever 25 in a clockwise direction. Under the weight of the object 39, as applied through the auxiliary lever 33, the lever 25 rocks in a clockwise direction until the bar 42 is engaged, in which position of the parts the lever 25 occupies the generally horizontal position shown in Figs. 4 and 6. The vertical edge of recess 41 is undercut, as indicated, to permit rocking movement of the lever without interference with the bar 42.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. Conveyor unloading apparatus, including a relatively stationary support, a conveyor, lever means pivotally mounted on said support including a lever lying parallel to the path of travel of the conveyor, a portion on one end of said lever in position to be engaged and depressed by the leading end of an object on the conveyor, a portion on the other end of said lever moved by depression of said one end to engage the object substantially at the trailing end thereof, and means for limiting movement of said lever in a direction to depress said one end, said means positioning said lever in conjunction with the weight of the object in a position approximately parallel to the conveyor with said portions extending above the plane of the conveyor.

2. Conveyor unloading apparatus according to claim 1, characterized by yielding means urging said lever in a direction to elevate said one end thereof into the path of travel of an object on the conveyor and to depress said other end out of such path.

3. Conveyor unloading apparatus, including a relatively fixed support, a conveyor, lever means pivotally mounted on said support, including a lever in parallel relation to the conveyor pivotally connected at its mid point to said support, independent means on each end of said lever engageable by an object on the conveyor and operable in response to continued motion of the conveyor to lift such object from the conveyor, and yielding means urging said lever in a direction to elevate one end thereof and to depress the other end, the construction and arrangement being such that a first object is lifted from said conveyor by said elevated end and the weight thereof depresses said elevated end and raises the opposite end of the lever in position to be engaged by and to lift a succeeding object.

4. Conveyor unloading apparatus, including a fixed support, a conveyor, lever means pivotally mounted on said support including a lever in parallel relation to the conveyor and pivotally connected intermediate its ends to said support, said lever having first and second ends as defined by the order in which objects on the conveyor pass in adjacent relation thereto, means on each end of the lever for lifting an object from the conveyor when interposed in the path of travel of such object, and yielding means urging said lever in a direction to interpose the said second end of said lever in the path of travel of a first object, said first object being lifted thereby from the conveyor and rocking said lever to interpose the said first end thereof into the path of travel of a succeeding object.

5. Conveyor unloading apparatus, including a conveyor, spaced apart relatively fixed supports between which the conveyor travels, a lever pivotally connected intermediate its ends to each support, said levers being in parallel relation to the conveyor and in opposed relation to one another and further having first and second ends as defined by the order in which objects on the conveyor pass in adjacent relation thereto, a yielding means urging each said levers in a direction to interpose the second said ends thereof into the path of travel of objects on the conveyor and to depress the second said ends out of such path of travel, a first object on the conveyor passing over said first ends and into cooperative relation with said second ends, said first object serving thereby to rock said levers to interpose said first ends of the levers into the path of travel of a succeeding object, and means on each end of each of said levers operable in conjunction with the motion of said conveyor to lift said objects from the conveyor.

6. Conveyor unloading apparatus according to claim 5, characterized in that said last named means includes first and second auxiliary levers pivotally connected intermediate their ends to each said levers, one on each side of the pivot point thereof, each said auxiliary levers having first and second ends respectively cooperable with the trailing and leading ends of objects on the conveyor in the same manner that said levers are cooperable with successive objects on the conveyor.

7. Conveyor unloading apparatus, including a support in adjacent relation to a moving conveyor, a lever pivotally connected intermediate its ends to said support and lying in parallel relation to said conveyor, said lever having first and second ends as defined by the order in which objects on the conveyor pass in adjacent relation thereto, yielding means urging said lever in a direction to interpose said second end thereof into the path of travel of an object on the conveyor and to depress said first end out of the path of travel, a cam surface on said second end of the lever, the leading end of an object engaging said cam surface to rock the lever against the urging of said yielding means, such motion of the lever being limited by contact of the opposite end thereof with the object adjacent the trailing edge, continued motion of the object under urging of the conveyor serving further to rock said lever and thereby to elevate the object upon the ends of said lever.

8. Conveyor unloading apparatus, including a support in adjacent relation to a moving conveyor, a lever pivotally connected intermediate its ends to said support and lying in parallel relation to said conveyor, said lever having first and second ends as defined by the order in which objects on the conveyor pass in adjacent relation thereto, yielding means urging said lever in a direction to interpose said second end thereof into the path of travel of an object on the conveyor and to depress said first end out of such path of travel, a cam surface on said second end of the lever, the leading end of an object engaging said cam surface to rock the lever against the urging of said yielding means, such motion of the lever being limited by contact of the opposite end thereof with the object adjacent to the trailing end thereof, continued motion of the object under urging of the conveyor serving further to rock said lever and thereby to elevate the object upon the ends of said lever, a yielding mounting for said support, said support having motion in response to the assuming of the weight of the object by said lever, another support connected to and movable by the first said support, and another lever on said other support constructed and arranged like the first said lever and brought by motion of said other support into cooperative relation with the conveyor to intercept and lift a succeeding object.

9. Conveyor unloading apparatus, including a relatively fixed support in adjacent relation to a moving conveyor, a lever pivotally connected to said support and having oppositely disposed arms extending in parallel relation to the conveyor, yielding means urging said lever in a direction to elevate one arm thereof and depress the other arm with respect to the plane of the conveyor, and lift means on each arm of the lever, the lift means on said one arm receiving a first object from the conveyor and the weight of said object serving to rock said lever to enable the lift means on the other arm to receive a succeeding object.

10. Conveyor unloading apparatus, including a relatively fixed support in adjacent relation to a moving conveyor, an unloading lever pivotally connected to said support and having oppositely disposed arms extending in parallel relation to the conveyor, said arms being respectively first and second arms as defined by the order in which objects on the conveyor pass in adjacent relation thereto, an auxiliary lever on each said arms, said auxiliary levers being pivotally connected to said arms and operable in response to relative, contacting motion of an object to lift such object from the conveyor, and yielding means urging said unloading lever in a direction to bring said second arm into cooperative relation with the conveyor and to place said first arm out of such cooperative relation, the weight of an object on said second arm serving to rock said lever to bring said first arm into cooperative relation with the conveyor to lift therefrom a succeeding object.

11. Conveyor unloading apparatus according to claim 10, characterized in that each of said auxiliary levers comprises a device shaped substantially like said unloading lever and having correspondingly disposed arms, and yielding means urging each said auxiliary arms in a direction to interpose the second arm thereof into the path of travel of an object on the conveyor, the leading edge of an object engaging said second arm to rock the said auxiliary arm against the urging of said yielding means, such motion being limited by contact of the first arm with the object adjacent its trailing edge, continued motion of the object under urging of the conveyor serving further to rock said lever and thereby to elevate the object upon the arms of said auxiliary lever.

12. Conveyor unloading apparatus, including laterally spaced apart relatively fixed supports, a pair of longitudinally spaced apart sprocket wheels mounted on each support, an endless chain running over each pair of said sprocket wheels, said chains receiving at one end of the supports objects to be unloaded, means for driving said chains in unison, an unloading lever mounted on each said support in parallel relation to the chain and having opposed arms extending toward the respective sprocket wheels, and means biasing each of said levers in a direction to raise the far ends of the levers in relation to the receiving end of the supports in position to receive a first object, the weight of said first object causing said levers to rock and position the near ends thereof to receive a succeeding object.

References Cited in the file of this patent

UNITED STATES PATENTS

| | | |
|---|---|---|
| 1,430,766 | Stebler | Oct. 3, 1922 |
| 1,557,765 | Nicholas | Oct. 20, 1925 |
| 1,819,032 | Lehman | Aug. 18, 1931 |